United States Patent
Oi et al.

(10) Patent No.: US 11,303,563 B2
(45) Date of Patent: Apr. 12, 2022

(54) NETWORK SERVICE SELECTION DEVICE AND NETWORK SERVICE SELECTION METHOD

(71) Applicant: Nippon Telegraph and Telephone Corporation, Tokyo (JP)

(72) Inventors: Aiko Oi, Tokyo (JP); Motomu Nakajima, Tokyo (JP); Yuji Soejima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/976,547

(22) PCT Filed: Mar. 4, 2019

(86) PCT No.: PCT/JP2019/008431
§ 371 (c)(1),
(2) Date: Aug. 28, 2020

(87) PCT Pub. No.: WO2019/172190
PCT Pub. Date: Sep. 12, 2019

(65) Prior Publication Data
US 2021/0044518 A1 Feb. 11, 2021

(30) Foreign Application Priority Data

Mar. 5, 2018 (JP) .............................. JP2018-039014

(51) Int. Cl.
*H04L 12/725* (2013.01)
*H04L 45/30* (2022.01)
*H04L 43/50* (2022.01)
*H04L 47/122* (2022.01)

(52) U.S. Cl.
CPC ............ *H04L 45/306* (2013.01); *H04L 43/50* (2013.01); *H04L 47/122* (2013.01)

(58) Field of Classification Search
CPC ...... H04L 45/306; H04L 43/50; H04L 47/122
See application file for complete search history.

(56) References Cited

U.S. PATENT DOCUMENTS

| | | | |
|---|---|---|---|
| 8,645,517 B2* | 2/2014 | Stolorz | ............. H04L 29/12783 709/223 |
| 2009/0182894 A1* | 7/2009 | Vasseur | ................... H04L 45/42 709/239 |
| 2010/0128606 A1* | 5/2010 | Patel | ................... H04L 43/0888 370/235 |

FOREIGN PATENT DOCUMENTS

JP 2004-260655 9/2004

* cited by examiner

*Primary Examiner* — Donald L Mills
(74) *Attorney, Agent, or Firm* — Fish & Richardson P.C.

(57) ABSTRACT

[Problem] A network service selection apparatus is provided that is able to suitably realize dynamic switching of a network service with a simple method.
[Solution] A network service selection apparatus 4 is provided that includes a network service switching unit 30 configured to, based on a specification of a network service stored and a service request from a user terminal apparatus, extract a combination of the network services of an initial operation and a spare network service and to connect two service providing systems corresponding to the combination of the network services of the initial operation, and a network service state confirmation unit 40 configured to confirm a state of a network service between the two service providing systems 2.

6 Claims, 6 Drawing Sheets

| LOCATION | BLOCK | OPERATOR NAME | CAPACITY (bit/s) | CHARGE (YEN/ONE MONTH) | POI |
|---|---|---|---|---|---|
| TOKYO | X | A | 50G | 5M | T1 |
| TOKYO | Y | A | 40G | 4M | T2 |
| TOKYO | Y | A | 40G | 3M | T3 |
| TOKYO | X | B | 40G | 3.8M | T4 |
| TOKYO | X | B | 30G | 3M | T5 |
| OSAKA | X | C | 20G | 1.9M | O1 |
| OSAKA | Y | C | 10G | 0.9M | O2 |
| OSAKA | X | D | 20G | 2M | O3 |
| FUKUOKA | X | C | 20G | 2M | F1 |

Fig. 3

| POI | TIME | TRAFFIC FLOW (byte) | |
| --- | --- | --- | --- |
| | | INFLOW FROM CONNECTION POINT | OUTFLOW TO CONNECTION POINT |
| T1 | 10:01 | 45G | 1G |
| | 10:05 | 45G | 500M |
| | 10:11 | 45G | 1.2G |
| | 10:15 | 40G | 700M |
| O1 | 10:01 | 1G | 45G |
| | 10:05 | 500M | 45G |
| | 10:11 | 1.2G | 45G |
| | 10:15 | 700M | 45G |

Fig. 4

| REPRESENTATIVE IP ADDRESS | TIME | TEST PACKET RESPONSE TIME [msec] |
|---|---|---|
| 117.10.212.13 | 10:01 | 8 |
| | 10:05 | 10 |
| | 10:11 | 7 |
| 109.21.106.33 | 10:00 | 23 |
| | 10:07 | 30 |
| | 10:13 | 38 |
| ... | ... | ... |

Fig. 5

| POI | DESTINATION IP ADDRESS | TRAFFIC VOLUME |
|---|---|---|
| O1 | 117.10.212.13 | 10000 |
| | 109.21.106.33 | 9379 |
| | 20.42.73.183 | 6793 |
| | ... | ... |
| | 76.125.12.232 | 65 |
| | 200.22.166.67 | 32 |

NETWORK SERVICE SELECTION DEVICE AND NETWORK SERVICE SELECTION METHOD

CROSS-REFERENCE TO RELATED APPLICATIONS

This application is a National Stage application under 35 U.S.C. § 371 of International Application No. PCT/JP2019/008431, having an International Filing Date of Mar. 4, 2019, which claims priority to Japanese Application Serial No. 2018-039014, filed on Mar. 5, 2018. The disclosure of the prior application is considered part of the disclosure of this application, and is incorporated in its entirety into this application.

TECHNICAL FIELD

The present disclosure relates to a technology for selecting a network service.

BACKGROUND ART

Patent Literature 1 discloses, in an IP network including a plurality of domains interconnected by Internet Exchange (IX), a technology where band management of passage sections is realized by acquiring path information to calculate a passage section across the domains.

CITATION LIST

Patent Literature

Patent Literature 1: JP-A-2004-260655

SUMMARY OF THE INVENTION

Technical Problem

The technology described in Patent Literature 1 requires a passage section and band management information of own and other domains, and thus the management information becomes enormous. Additionally, at the time of management of the passage section of the own domain, the management receives an effect of path control of another domain. Further, it is necessary to secure a band from a domain for which connection has been negotiated in advance, and there is a possibility that the band cannot be secured.

The present disclosure has been made in view of the above circumstances, and has a subject that provides a network service selection apparatus and a network service selection method that can suitably realize dynamic switching of a network service with a simple method.

Means for Solving the Problem

In order to provide the subject described above, an object of the present disclosure is to provide a network service selection apparatus that combines two network services from a plurality of network services, the network service selection apparatus including: a storage unit configured to store a specification of the plurality of network services provided by a plurality of service providing systems; a network service switching unit configured to, based on the specification of the network services stored and a service request from a user terminal apparatus, extract a combination of the network services of an initial operation and a spare network service and to connect two service providing systems corresponding to the combination of the network services of the initial operation; and a network service state confirmation unit configured to confirm a state of a network service between the two service providing systems at present including the initial operation, wherein when the network service state confirmation unit confirms that the network service at present is abnormal, the network service switching unit changes the combination of the network services by switching from the service providing system corresponding to the network service that is abnormal to the service providing system corresponding to the spare network service.

According to such a configuration, dynamic switching of the network service with a simple method can be suitably realized by extracting a spare network service together with the combination of the network services of the initial operation and confirming the state of the network service by transmitting a test packet.

The network service state confirmation unit may be configured to measure, as the state of the network service, a response time to a test packet by transmitting the test packet to the two service providing systems corresponding to the combination of the network services at present including the initial operation.

According to such a configuration, the state of the network service can be easily confirmed by using the response time to the test packet, and the dynamic switching of the network service can be more suitably realized.

The network service state confirmation unit may be configured to acquire a traffic of the service providing system as the state of the network service.

According to such a configuration, the state of the network service can be easily confirmed by using the traffic, and the dynamic switching of the network service can be more suitably realized.

Additionally, the present disclosure provides a network service selection method performed by a network service selection apparatus that combines two network services from a plurality of network services, the network service selection method including: extracting, based on a specification of the plurality of network services provided by a plurality of service providing systems stored in a storage unit and a service request from a user terminal apparatus, a combination of the network services of an initial operation and a spare network service and connecting two service providing systems corresponding to the combination of the network services of the initial operation; confirming a state of a network service between the two service providing systems at present including the initial operation; and changing, when the network service at present is confirmed to be abnormal, the combination of the network services by switching from the service providing system corresponding to the network service that is abnormal to the service providing system corresponding to the spare network service.

Effects of the Invention

According to the present disclosure, dynamic switching of a network service can be suitably realized with a simple method.

DESCRIPTION OF EMBODIMENTS

Figure 1:
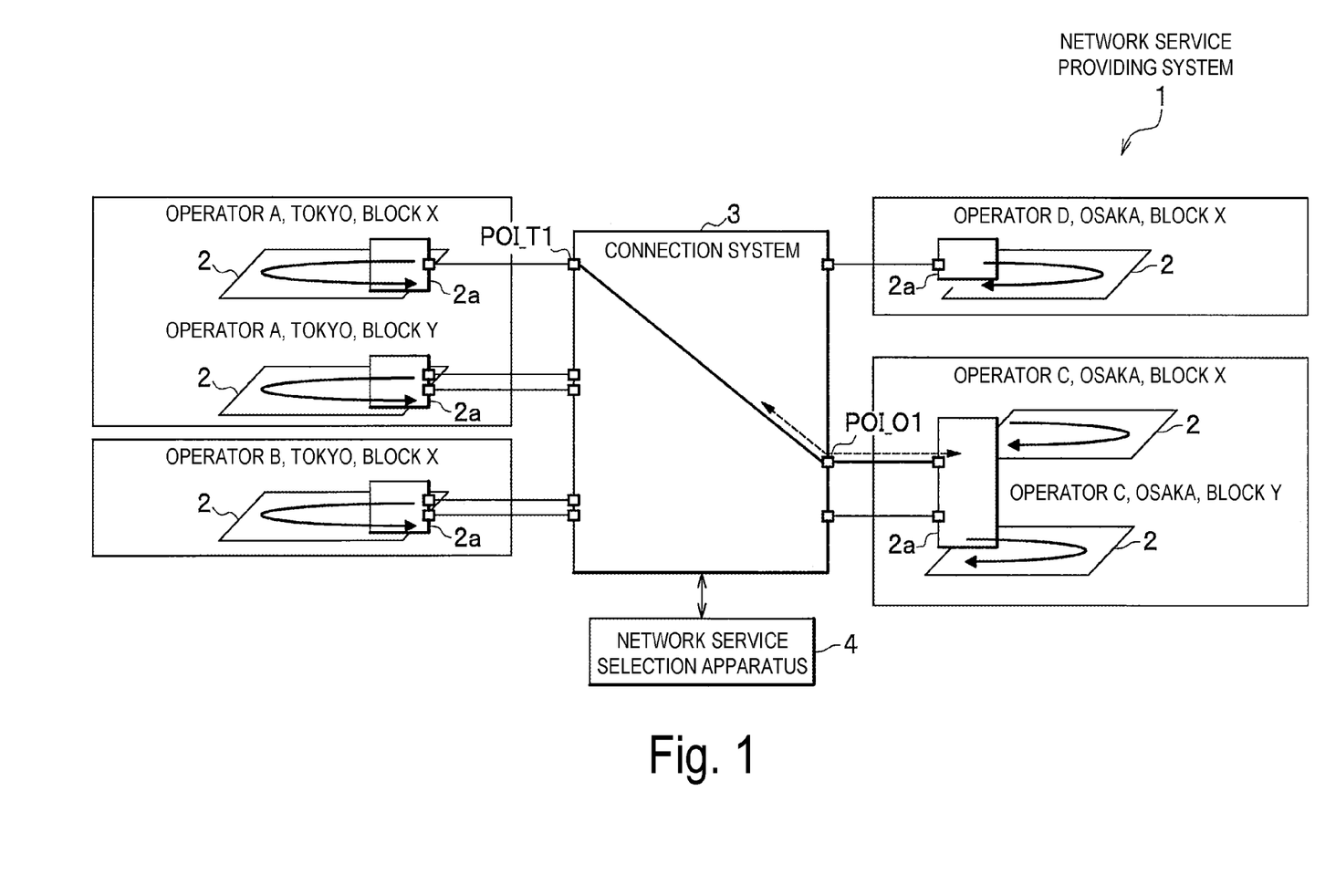
FIG. 1 is a diagram schematically illustrating a network service providing system according to an embodiment of the present disclosure.

Embodiments of the present disclosure will be described below with reference to the drawings. As illustrated in FIG. 1, a network service providing system 1 according to an embodiment of the present disclosure is a system for providing a network service for connecting a pair of user terminals, and includes a plurality of service providing systems 2, a connection system 3 and a network service selection apparatus 4.

Service Providing System

The service providing system 2 is provided in each region by each operator, and provides a network service to a pair of user terminal apparatuses (not illustrated). The service providing system 2 is constituted with a switch 2a serving as an interface to the connection system 3, a router, various servers, etc. The service providing system 2 provides a network service for mutually communicating with a pair of user terminal apparatuses according to a service specification described later.

Connection System

The connection system 3 is provided to be able to communicate with the plurality of service providing systems 2. The connection system 3 virtually connects the two service providing systems 2 so that a network service can be provided by performing a setting such as a Virtual Local Area Network (VLAN) and a Virtual Private Network (VPN) in the plurality of service providing systems 2 that are physically connected, and thus realizes a network service between the pair of user terminal apparatuses. In other words, the connection system 3 physically connects all the service providing systems 2, and virtually connects the two service providing systems 2 (for example, the service providing system 2 accommodating a user terminal apparatus on the calling side in an IP telephone and the service providing system 2 accommodating a user terminal apparatus on the receiving side) to each other on a one-to-one basis when providing a network service. For example, when a certain network service is provided, the connection system 3 connects the service providing system 2 of an operator A, Tokyo, and a block X and the service providing system 2 of an operator D, Osaka, and a block X. Additionally, when another network service is provided, the connection system 3 connects the service providing system 2 of the operator A, Tokyo, and the block X and the service providing system 2 of an operator C, Osaka, and a block X.

The connection system 3 has a service connection point (POI) as an interface with the service providing system 2. The connection system 3 measures a traffic flow for each service connection point by using, for example, Simple Network Management Protocol (SNMP), and transmits a measurement result to the network service selection apparatus 4 (periodically). In the example illustrated in FIG. 1, a total of eight service connection points is provided for each interface with the plurality of service providing systems 2.

Network Service Selection Apparatus

Figure 2:
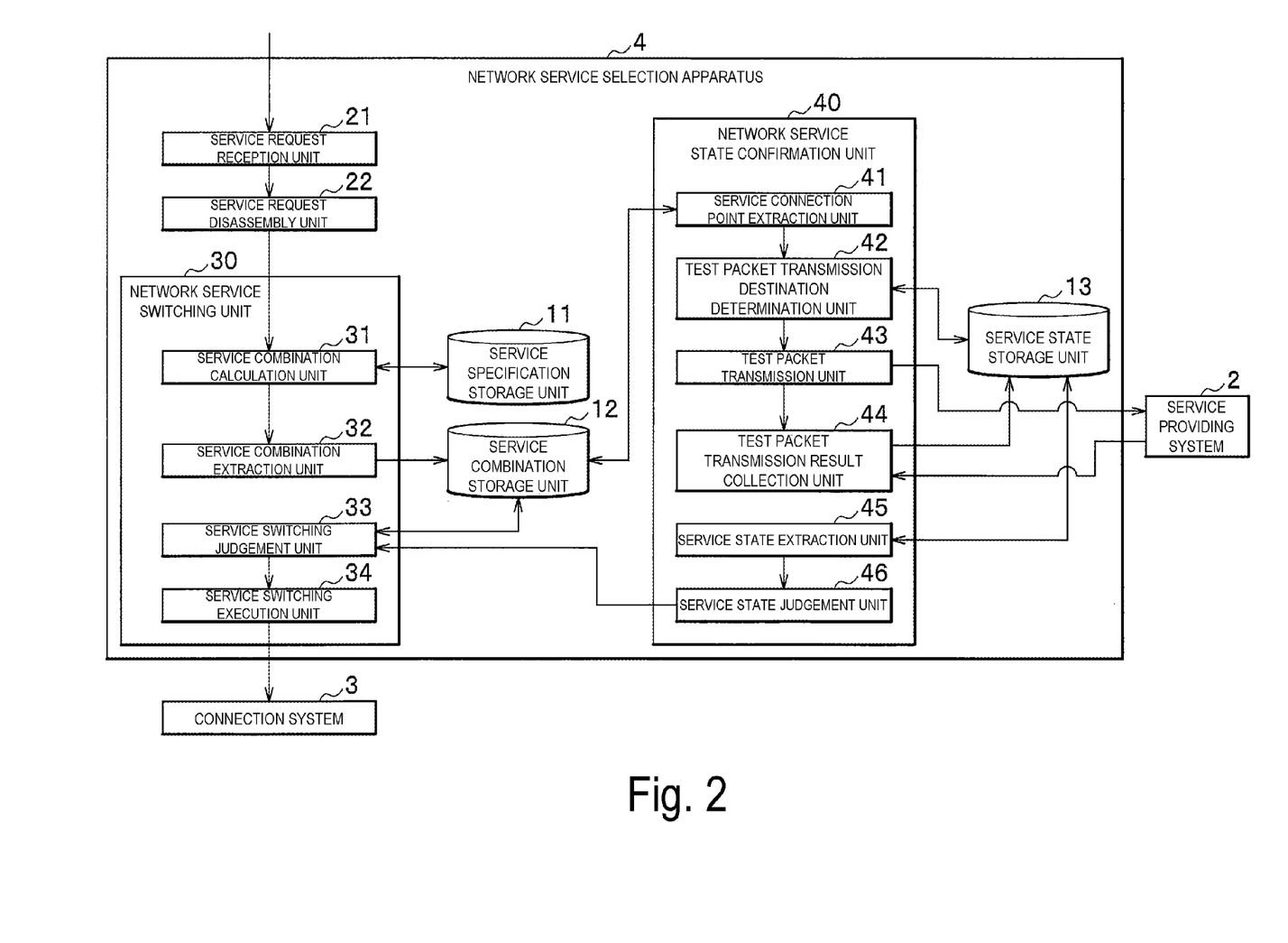
FIG. 2 is a block diagram illustrating a network service selection apparatus according to an embodiment of the present disclosure.

When providing a network service to a pair of the user terminal apparatuses, the network service selection apparatus 4 selects the two service providing systems 2 to provide a network service. In other words, the network service selection apparatus 4 builds a network (route) for providing a network service by the two service providing systems 2 selected and the connection system 3 that virtually connects the service providing systems 2 to each other. The network service selection apparatus 4 is constituted with a Central Processing Unit (CPU), a Read-Only Memory (ROM), a Random Access Memory (RAM), an input/output circuit, etc. As illustrated in FIG. 2, the network service selection apparatus 4 includes, as functional units, a service specification storage unit 11, a service combination storage unit 12, a service state storage unit 13, a service request reception unit 21, a service request disassembly unit 22, a network service switching unit 30, and a network service state confirmation unit 40.

Service Specification Storage Unit

Figure 3:
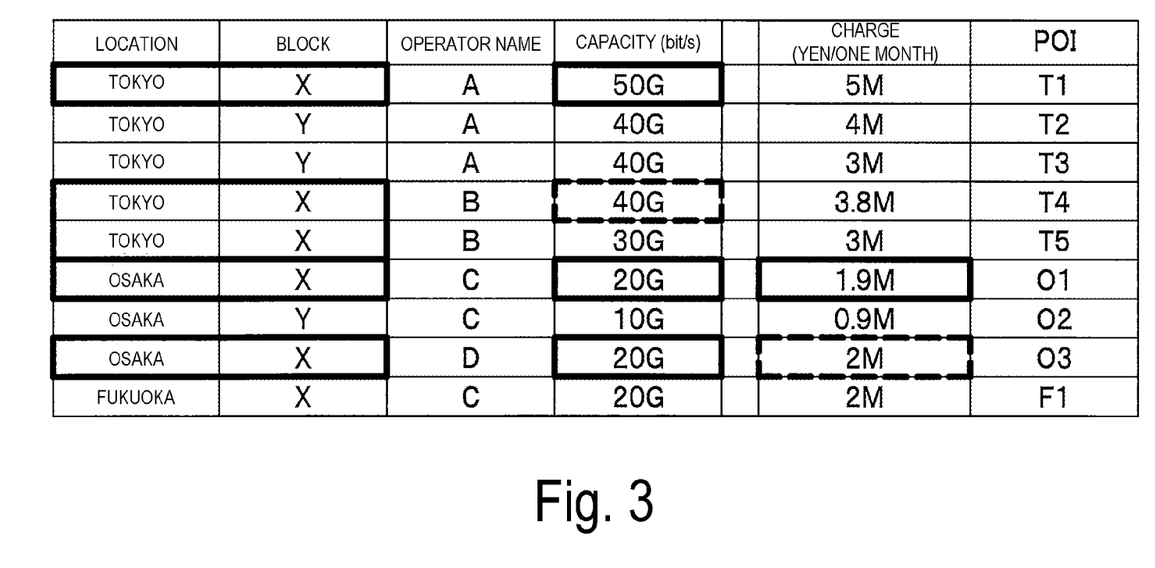
FIG. 3 is a diagram schematically illustrating an example of a service specification stored in a service specification storage unit.

As illustrated in FIG. 3, in the service specification storage unit 11, a base and a block as a location of the service providing system 2, an operator name, a communication capacity, a charge, and a service connection point are stored as a network service specification, that is, a service specification, for each network service (or service providing system 2), in advance as a related database.

Service Combination Storage Unit

As illustrated in FIG. 2, the service combination storage unit 12 stores a service combination in operation and a part of a spare (spare candidate) service combination as a database.

Service State Storage Unit

Figure 4:
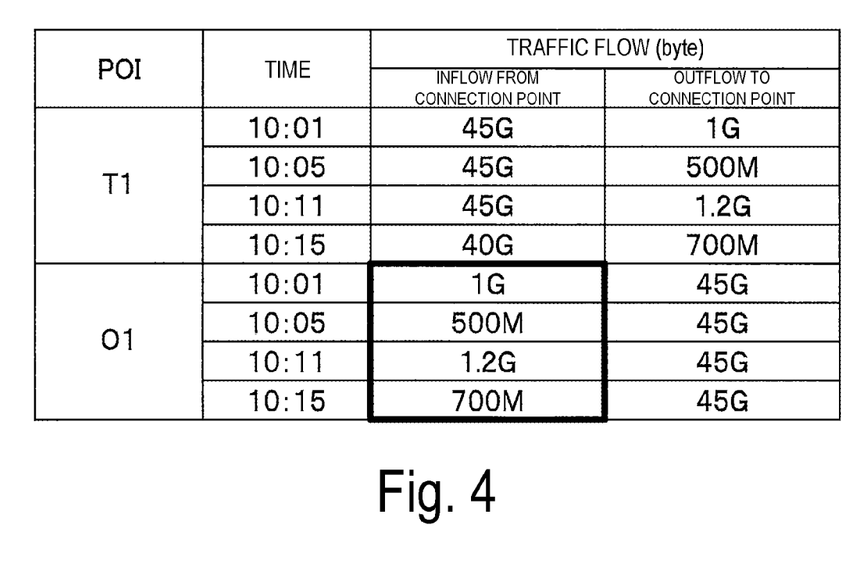
FIG. 4 is a diagram schematically illustrating an example of a service state stored in a service state storage unit.

As illustrated in FIG. 4, the first database of the service state storage unit 13 stores a service connection point, a time (collection time of a traffic flow), and a traffic flow (inflow and outflow) at the service connection point, in association with each other as a service state. Here, the service connection point is a point in the connection system 3 that is connected to the switch 2a of the service providing system 2. One service connection point corresponds to one of the switches 2a of the plurality of service providing systems 2 on a one-to-one basis.

Figure 5:
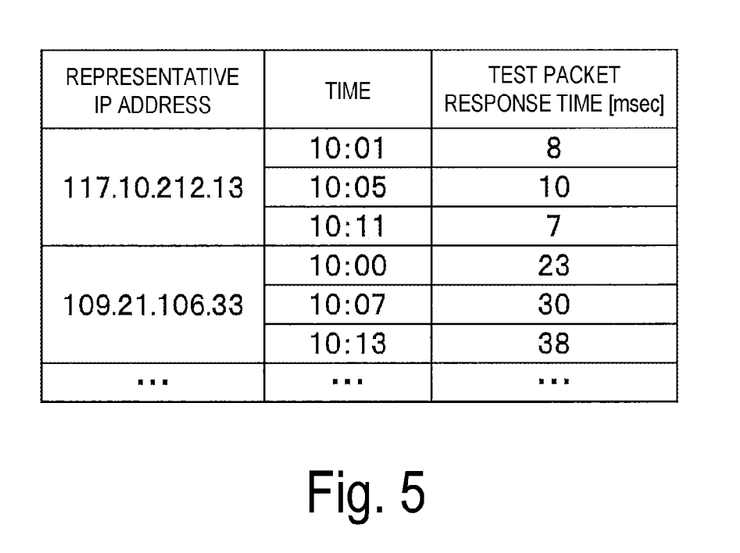
FIG. 5 is a diagram schematically illustrating an example of a service state stored in the service state storage unit.

Additionally, as illustrated in FIG. 5, the second database of the service state storage unit 13 stores a destination Internet Protocol (IP) address, a time, and a response time (from a transmission time of a test packet to a reception time of a response signal), in association with each other. Here, the destination IP address is a destination of a traffic flowing from the service connection point into/out of the service providing system 2, and indicates one of a plurality of apparatuses (for example, a server) included in the service providing system 2. The destination IP address in the second database is a top one (for example, the top 10%), where a traffic flow is large, among destination IP addresses in the third database described later.

Figure 6:
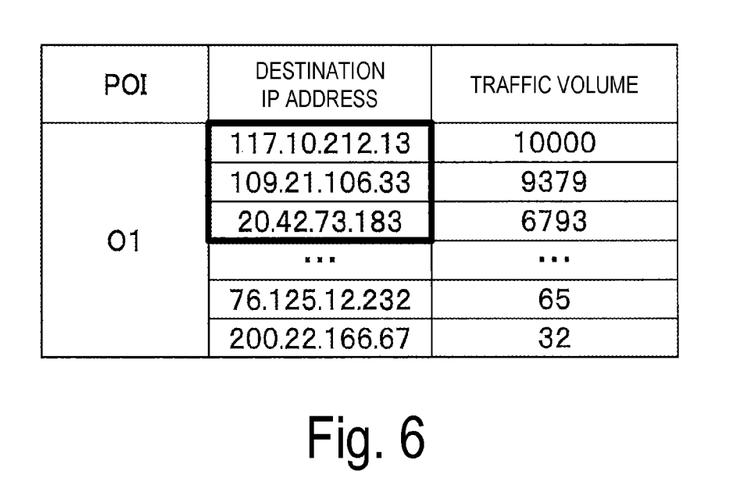
FIG. 6 is a diagram schematically illustrating an example of a service state stored in the service state storage unit.

Additionally, as illustrated in FIG. 6, the third database of the service state storage unit 13 stores a service connection point, a destination IP address, and a traffic flow (inflow or outflow) at the destination IP address, in association with each other as a service state.

Service Request Reception Unit

The service request reception unit 21 accepts (receives) a service request from the service providing system 2 that has received a call signal when the call signal of, for example, the IP telephone is transmitted from a user terminal apparatus (not illustrated), and outputs the service request that is accepted to the service request disassembly unit 22.

Service Request Disassembly Unit

The service request disassembly unit 22 acquires the service request, disassembles the content of the acquired service request, and outputs, from among the disassembled service request, that necessary for service switching to the network service switching unit 30. In the present embodiment, as a service request output to the network service switching unit 30, in order of higher priority, there are priority 1: connection destination (Tokyo (X) and Osaka (X)), priority 2: capacity (large capacity), priority 3: charge (low charge), etc. Note that the service request necessary for the service switching is not limited to the above, and may include a service quality (video/image quality, etc.).

Network Service Switching Unit

The network service switching unit 30 includes a service combination calculation unit 31, a service combination extraction unit 32, a service switching judgement unit 33, and a service switching execution unit 34 as functional units.

Service Combination Calculation Unit

The service combination calculation unit 31 acquires the disassembled service request, calculates a plurality of service combinations by referring to the service specification storage unit 11 by using the acquired service request, and outputs, together with the service request, the plurality of calculated service combinations to the service combination extraction unit 32. In the example illustrated in FIG. 3, the service combination calculation unit 31 calculates, based on the connection destination of priority 1 of the service request, a combination of a network service provided by the service providing system 2 of the operators A and B in Tokyo (X) and a network service provided by the service providing system 2 of the operators C and D in Osaka (X), as a service combination. Subsequently, the service combination calculation unit 31 outputs, together with the remaining service requests, the calculated service combination to the service combination extraction unit 32.

Service Combination Extraction Unit

The service combination extraction unit 32 acquires the calculated plurality of service combinations and service requests, extracts a service combination of an initial operation and a spare service combination from the plurality of service combinations based on the acquired service request, and stores an extraction result in the service combination storage unit 12. In the example illustrated in FIG. 3, the service combination extraction unit 32 determines, based on the capacity of priority 2 of the service request, the network service provided by the service providing system 2 of the operator A in Tokyo (X) having the largest capacity of 50G to be one of the service combinations of the initial operation. Then, the service combination extraction unit 32 determines the network service provided by the service providing system 2 of the operator B in Tokyo (X) having the next largest capacity of 40G to be one of the spare service combinations.

Additionally, the service combination extraction unit 32 cannot determines the other of the service combinations of the initial operation from the operators C and D in Osaka (X) because the capacity is equal to 200, etc. based on the capacity of priority 2 of the service request. Accordingly, the service combination extraction unit 32 sets the network service provided by the service providing system 2 of the operator C in Osaka (X), which has a relatively low charge, to be the other of the service combinations of the initial operation based on the charge of priority 3 of the service request, and determines the network service provided by the service providing system 2 of the operator D in Osaka (X), which has a relatively high charge, to be the other of the spare service combination.

Service Switching Judgement Unit

At the time of an initial operation, the service switching judgement unit 33 reads the service combination of the initial operation stored in the service combination storage unit 12 and outputs the read service combination to the service switching execution unit 34. Additionally, when a determination result that a service state is abnormal from the service state judgement unit 46 is acquired, the service switching judgement unit 33 refers to the service combination storage unit 12 by using an abnormal part included in the determination result to read a spare corresponding to the abnormal part, and outputs the read spare to the service switching execution unit 34.

Service Switching Execution Unit

At the time of an initial operation, the service switching execution unit 34 acquires a service combination of the initial operation, and sets a combination of the network services in the connection system 3 based on the acquired service combination. Additionally, when the service state is abnormal, the service switching execution unit 34 acquires a spare and switches the combination of the network services in the connection system 3 based on the acquired spare. For example, when the network service provided by the service providing system 2 of the operator C in Osaka (X) is abnormal in the service combination of the initial operation, the service switching execution unit 34 builds a service combination, in which the network service provided by the service providing system 2 of the operator C in Osaka (X) is switched to the network service provided by the service providing system 2 of the operator D in Osaka (X), in the connection system 3.

Network Service State Confirmation Unit

The network service state confirmation unit 40 confirms a state of the network service provided by the plurality of service providing systems 2. The network service state confirmation unit 40 includes a service connection point extraction unit 41, a test packet transmission destination determination unit 42, a test packet transmission unit 43, a test packet transmission result collection unit 44, a service state extraction unit 45, and the service state judgement unit 46, as functional units.

Service Connection Point Extraction Unit

The service connection point extraction unit 41 extracts a service connection point relating to a network service in operation (for example, in the initial operation) from the service combination storage unit 12, and outputs the extracted service connection point to the test packet transmission destination determination unit 42.

Test Packet Transmission Destination Determination Unit

The test packet transmission destination determination unit 42 acquires the service connection point, determines a test packet transmission destination (IP address) by referring to the service state storage unit 13 (third database illustrated in FIG. 6) by using the acquired service connection point, and outputs the determined test packet transmission destination to the test packet transmission unit 43. In the present embodiment, the test packet transmission destination determination unit 42 extracts a destination IP address, as a test packet transmission destination, whose traffic volume occupies a predetermined amount (for example, an upper 10%) with respect to the service connection point.

Test Packet Transmission Unit The test packet transmission unit 43 acquires the test packet transmission destination, and transmits the test packet to an apparatus, which is the acquired test packet transmission destination, in the service providing system 2. The apparatus in the service providing system 2 that has received the test packet returns a response signal corresponding to the test packet.

Test Packet Transmission Result Collection Unit

The test packet transmission result collection unit 44 collects a test packet transmission result (that is, response time to the test packet) returned from the apparatus in the service providing system 2, and stores the collected test packet transmission result in the service state storage unit 13.

In the present embodiment, the test packet transmission result collection unit 44 collects a traffic flow for each service connection point transmitted from the connection system 3 and stores the collected traffic flow in the service state storage unit 13.

Service State Extraction Unit

The service state extraction unit 45 extracts a service state from the service state storage unit 13 (first and second databases illustrated in FIG. 4 and FIG. 5), and outputs the extracted service state to the service state judgement unit 46.

Service State Judgement Unit

The service state judgement unit 46 acquires the service state, determines whether the acquired service state is normal or abnormal, and when the service state is abnormal, outputs the determination result including the abnormal part to the service switching judgement unit 23. For example, the service state judgement unit 46 can determine that the service state is abnormal when the response time is equal to or longer than a predetermined time. Additionally, the service state judgement unit 46 can determine that the service state is abnormal when a traffic flow per predetermined time interval is equal to or more than an upper limit or equal to or less than a lower limit. The predetermined time in the response time, the predetermined time interval in the traffic flow, the upper limit value, and the lower limit value can be appropriately changed.

Operation Example

Figure 7:
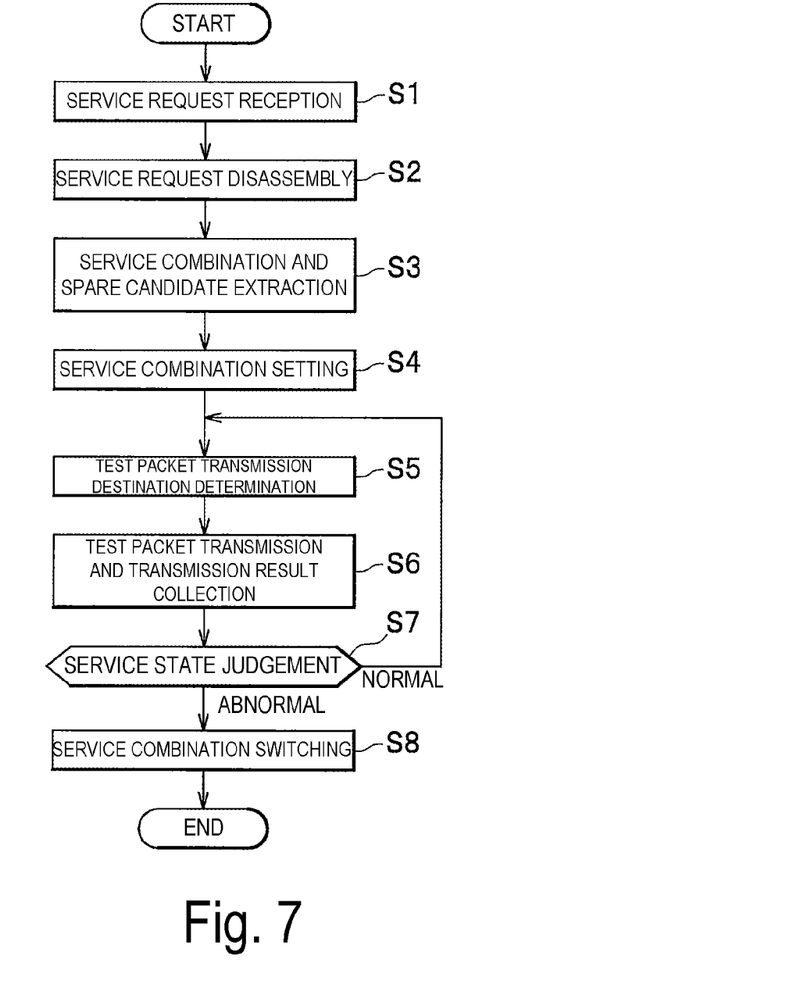
FIG. 7 is a flowchart for explaining an operation example of the network service selection apparatus according to the embodiment of the present disclosure.

Subsequently, an operation example of the network service selection apparatus 4 will be described with reference to the flowchart of FIG. 7 (see FIG. 2 as appropriate).

Network Service Determination Step

First, if the user terminal apparatus transmits a call signal of, for example, the IP telephone, the service providing system 2 receives the call signal and transmits a service request responding to the call signal. Subsequently, the service request reception unit 21 receives the service request transmitted by the service providing system 2 (step S1). Subsequently, the service request disassembly unit 22 disassembles a content of the service request and obtains a service request necessary for a service combination (step S2).

Subsequently, based on the service request and the service specification stored in the service specification storage unit 11, the service combination calculation unit 31 and the service combination extraction unit 32 extract a service combination of an initial operation and a spare network service (to which the service providing system 2 corresponds), and store an extraction result in the service combination storage unit 12 (step S3). Subsequently, the service switching judgement unit 33 reads the service combination of the initial operation from the service combination storage unit 12, and the service switching execution unit 34 sets the service combination by controlling the connection system 3 based on the read service combination (step S4).

Network State Confirmation Step

Subsequently, the service connection point extraction unit 41 extracts a service connection point of the service combination of the initial operation from the service combination storage unit 12, and the test packet transmission destination determination unit 42 determines a transmission destination of the test packet by referring to the service state storage unit 13 by using the extracted service connection point (step S5).

Subsequently, the test packet transmission unit 43 transmits the test packet by using the test packet transmission destination, and the test packet transmission result collection unit 44 collects a response time as a test packet transmission result and collects a traffic flow from the connection system 3 (step S6). Subsequently, the service state extraction unit 45 reads a service state from the service state storage unit 13, and the service state judgement unit 46 determines whether the state (for example, initial operation) of the current network service is normal or abnormal based on the read service state (step S7). When it is determined in step S7 that the state of the network service is normal, the flow returns to step S5.

Network Service Switching Step

When it is determined in step S7 that the state of the network service is abnormal, the service switching judgement unit 33 reads the service providing system 2 corresponding to the spare network service corresponding to an abnormal part from the service combination storage unit 12, and the service switching execution unit 34 switches the service combination by controlling the connection system 3 based on the service providing system 2 corresponding to the spare network service read (step S8).

The network service providing system 1 according to the embodiment of the present disclosure determines a spare network service together with a combination of the network services of the initial operation and confirms the state of the network service, and thus can suitably realize the dynamic switching of the network service with a simple method.

Additionally, the network service providing system 1 can easily confirm the state of the network service by using the response time to the test packet, and can more suitably realize the dynamic switching of the network service.

Additionally, the network service providing system 1 can easily confirm the state of the network service by using the traffic, and can more suitably realize the dynamic switching of the network service.

Although embodiments of the present disclosure have been described above, the present disclosure is not limited to the above embodiments, and can be appropriately changed without departing from the gist of the present disclosure. For example, the spare network services (to which the service providing systems 2 correspond) may be assigned priorities with respect to one and the other of the network services so that two or more can be set. Additionally, after switching to the spare network service (to which the service providing system 2 corresponds), the network service selection apparatus 4 may be configured to make the network service (to which the service providing system 2 corresponds) having the abnormality available again as a spare.

Additionally, the network service selection apparatus 4 and the network service providing system 1 of the present disclosure are not limited to provision of the network service in the IP telephone, but can be applied to provision of various network services such as the network service in a web service.

Additionally, the network service selection apparatus 4 may be configured to transmit a test packet before the initial operation of the two extracted service providing systems 2, and to switch the network service that has been abnormal to a spare network service when there is an abnormality to provide the network service of the initial operation.

The network service selection apparatus 4 may be configured to transmit a test packet to each of the two extracted service providing systems 2, and to indirectly confirm a state of the overall network service provided by the two service providing systems 2 by receiving a response signal of the test packet and confirming the state of the network service provided by each of the service providing systems 2.

Additionally, the network service selection apparatus 4 may be configured to transmit a test packet that passes through the two service providing systems 2 that are extracted and connected at once, and to receive a response signal of the test packet and directly confirm a state of the entire network service provided by the two service providing systems 2.

REFERENCE SIGNS LIST

1 Network service providing system
2 Service providing system
3 Connection system
4 Network service selection apparatus
11 Service specification storage unit (storage unit)
30 Network service switching unit
40 Network service state confirmation unit

The invention claimed is:

1. A network service selection apparatus that combines two network services from a plurality of network services, the network service selection apparatus comprising:
   a storage medium configured to store a specification of the plurality of network services provided by a plurality of service providing systems;
   a network service switching unit, including one or more processors, configured to, based on a) the specification of the network services stored and b) a service request from a user terminal apparatus for establishing a communication,
      i) extract a combination of the network services of an initial operation and a spare network service, wherein the combination of the network services of the initial operation comprise a first service providing system at a calling side of the communication and a second service providing system at a receiving side of the communication, the first and second service providing system are separate systems, wherein the spare network service comprises a third service providing system, at the calling side of the communication, that serves as a spare system for the first service providing system, and a fourth service providing system, at the receiving side of the communication, that serves as a spare system for the second service providing system, the third and fourth service providing system are separate systems, and
      ii) connect two service providing systems comprising the first and the second service providing systems corresponding to the combination of the network services of the initial operation; and
   a network service state confirmation unit, including one or more processors, configured to confirm a state of a network service between the two service providing systems at present including the initial operation, wherein
   when the network service state confirmation unit confirms that the network service at present is abnormal, the network service switching unit changes the combination of the network services by switching from the service providing system corresponding to the network service that is abnormal to the service providing system corresponding to the spare network service, wherein the switching comprises:
      switching from the first service providing system to the third service providing system, or
      switching from the second service providing system to the fourth service providing system.

2. The network service selection apparatus according to claim 1, wherein the network service state confirmation unit is configured to measure, as the state of the network service, a response time to a test packet by transmitting the test packet to the two service providing systems corresponding to the combination of the network services at present including the initial operation.

3. The network service selection apparatus according to claim 1, wherein the network service state confirmation unit is configured to acquire a traffic of the service providing system as the state of the network service.

4. A network service selection method performed by a network service selection apparatus that combines two network services from a plurality of network services, the network service selection method comprising:
   extracting, based on a specification of the plurality of network services provided by a plurality of service providing systems stored in a storage unit and a service request from a user terminal apparatus for establishing a communication, a combination of the network services of an initial operation and a spare network service, wherein the combination of the network services of the initial operation comprise a first service providing system at a calling side of the communication and a second service providing system at a receiving side of the communication, the first and second service providing system are separate systems,
      wherein the spare network service comprises a third service providing system, at the calling side of the communication, that serves as a spare system for the first service providing system, and a fourth service providing system, at the receiving side of the communication, that serves as a spare system for the second service providing system, the third and fourth service providing system are separate systems,
   connecting two service providing systems comprising the first and the second service providing systems corresponding to the combination of the network services of the initial operation;
   confirming a state of a network service between the two service providing systems at present including the initial operation; and
   changing, when the network service at present is confirmed to be abnormal, the combination of the network services by switching from the service providing system corresponding to the network service that is abnormal to the service providing system corresponding to the spare network service, wherein the switching comprises:
      switching from the first service providing system to the third service providing system, or switching from the second service providing system to the fourth service providing system.

5. The network service selection method according to claim 4, further comprising:

measuring, as the state of the network service, a response time to a test packet by transmitting the test packet to the two service providing systems corresponding to the combination of the network services at present including the initial operation.

6. The network service selection method according to claim 4, further comprising:

acquiring a traffic of the service providing system as the state of the network service.

* * * * *